United States Patent
Deegan

(10) Patent No.: US 11,440,509 B2
(45) Date of Patent: Sep. 13, 2022

(54) METHOD FOR REMOVING DEPOSITS ON A LENS OF A CAMERA OF A MOTOR VEHICLE CONSIDERING A TEMPERATURE OF THE LENS, CLEANING DEVICE, CAMERA ASSEMBLY AS WELL AS MOTOR VEHICLE

(71) Applicant: Connaught Electronics Ltd., Tuam (IE)

(72) Inventor: Brian Michael Thomas Deegan, Galway (IE)

(73) Assignee: Connaught Electronics Ltd., Tuam (IE)

( * ) Notice: Subject to any disclaimer, the term of this patent is extended or adjusted under 35 U.S.C. 154(b) by 908 days.

(21) Appl. No.: 16/315,415

(22) PCT Filed: Jul. 3, 2017

(86) PCT No.: PCT/EP2017/066428
§ 371 (c)(1),
(2) Date: Jan. 4, 2019

(87) PCT Pub. No.: WO2018/007283
PCT Pub. Date: Jan. 11, 2018

(65) Prior Publication Data
US 2019/0299938 A1    Oct. 3, 2019

(30) Foreign Application Priority Data
Jul. 4, 2016  (DE) .......................... 102016112161.4

(51) Int. Cl.
*G02B 1/00* (2006.01)
*B60S 1/56* (2006.01)
(Continued)

(52) U.S. Cl.
CPC ............ *B60S 1/56* (2013.01); *G02B 27/0006* (2013.01); *B60R 11/04* (2013.01); *B60R 2011/004* (2013.01); *B60S 1/52* (2013.01)

(58) Field of Classification Search
CPC .......... B60S 1/56; B60S 1/52; G02B 27/0006; B60R 11/04; B60R 2011/004
See application file for complete search history.

(56) References Cited

U.S. PATENT DOCUMENTS

2011/0266375 A1   11/2011  Ono et al.
2012/0117745 A1   5/2012   Hattori et al.
(Continued)

FOREIGN PATENT DOCUMENTS

| DE | 102010041475 A1 | 6/2011 |
| EP | 3069942 A1 | 9/2016 |
| WO | 2012129521 A1 | 9/2012 |

OTHER PUBLICATIONS

International Search Report and Written Opinion Issued in Corresponding PCT Application No. PCT/EP2017/066428, dated Aug. 30, 2017 (8 Pages).

(Continued)

*Primary Examiner* — Euncha P Cherry
(74) *Attorney, Agent, or Firm* — Osha Bergman Watanabe & Burton LLP

(57) ABSTRACT

The invention relates to a method for removing deposits on a lens (11) of a camera (9) of a motor vehicle (1), in which a contaminant present on the lens (11) is removed as the deposit, wherein a cleaning liquid (13) is applied to the lens by means of a washing device (12) for removing the contaminant, wherein a temperature of the lens (11) is determined and the application of the cleaning liquid (13) to the lens (11) is performed depending on the determined temperature.

12 Claims, 2 Drawing Sheets

(51) Int. Cl.
*G02B 27/00* (2006.01)
*B60R 11/04* (2006.01)
*B60R 11/00* (2006.01)
*B60S 1/52* (2006.01)

(56) References Cited

U.S. PATENT DOCUMENTS

2014/0270379 A1    9/2014  Snider
2015/0296108 A1*  10/2015  Hayakawa ................ B60S 1/52
                                              348/148

OTHER PUBLICATIONS

Search Report Issued in Corresponding German Application No. 102016112161.4, dated Mar. 2, 2017 (5 Pages).

\* cited by examiner

METHOD FOR REMOVING DEPOSITS ON A LENS OF A CAMERA OF A MOTOR VEHICLE CONSIDERING A TEMPERATURE OF THE LENS, CLEANING DEVICE, CAMERA ASSEMBLY AS WELL AS MOTOR VEHICLE

The present invention relates to a method for removing deposits on a lens of a camera of a motor vehicle, in which a contaminant present on the lens is removed as the deposit, wherein a cleaning liquid is applied to the lens by means of a washing device for removing the contaminant. Moreover, the present invention relates to a cleaning device for a camera. Furthermore, the present invention relates to a camera assembly. Finally, the present invention relates to a motor vehicle.

BACKGROUND OF THE INVENTION

Presently, the interest is directed to cameras for motor vehicles. Such cameras can for example be a part of a driver assistance system, which serves for assisting the driver in driving the motor vehicle. Therein, it can be provided that multiple cameras are arranged distributed on the motor vehicle. By these cameras, an environmental region of the motor vehicle can then be captured. In particular, image sequences or video data can be provided by the cameras, which describe or depict the environmental region. This video data can then for example be presented on a display device in the interior of the motor vehicle. Further, the video data can be used to recognize objects in the environment of the motor vehicle with the aid of a corresponding object recognition algorithm.

Since the cameras are usually arranged at the outside of the motor vehicle, they are exposed to the environmental conditions. For example, this can result in the fact that water drops deposit on a lens of the camera depending on the weather conditions or temperature differences. Further, it can be the case that ice and/or snow deposit on the lens of the camera. Hereto, heating devices are known from the prior art, which serve for heating the lens of the camera and thus removing the water drops and/or ice from the lens.

Moreover, corresponding washing devices are known from the prior art, by which a cleaning liquid can be applied to the lens. Hereto, the cleaning liquid can be sprayed onto the lens with the aid of the washing device. In this manner, it is allowed removing deposits in the form of contaminants from the lens.

Hereto, US 2014/0270379 A1 describes an automated camera cleaning system for motor vehicles. The system analyzes an image captured by the camera and determines if the image is obstructed by small parts. If it is determined that the image is obstructed, the system automatically sprays the camera lens with a cleaning liquid to remove the small parts from the lens.

BRIEF SUMMARY OF THE INVENTION

It is the object of the present invention to demonstrate a solution, how the removal of deposits from a lens of a camera can be more securely and reliably performed.

According to the invention, this object is solved by a method, by a cleaning device, by a camera assembly as well as by a motor vehicle having the features according to the respective independent claims. Advantageous developments of the present invention are the subject matter of the dependent claims.

In an embodiment of a method for removing deposits on a lens of a camera of a motor vehicle, preferably, a contaminant present on the lens is removed as the deposit. Therein, a cleaning liquid is in particular applied to the lens by means of a washing device for removing the contaminant. Furthermore, a temperature of the lens is preferably determined and the application of the cleaning liquid to the lens is in particular performed depending on the determined temperature.

A method according to the invention serves for removing deposits on a lens of a camera of a motor vehicle. Herein, a contaminant present on the lens is removed as the deposit, wherein a cleaning liquid is applied to the lens by means of a washing device for removing the contaminant. Furthermore, a temperature of the lens is determined and the application of the cleaning liquid is performed depending on the determined temperature.

With the aid of the method, deposits on the lens of a camera are to be removed. The camera is in particular a camera, which can be arranged at the outside of the motor vehicle. The camera or the lens of the camera is therefore exposed to the environmental conditions. In the operation of the motor vehicle or during travel of the motor vehicle, contaminants can deposit on the lens of the camera. These contaminants can for example include dust or dirt particles. Further, these contaminants can contain oil or fat. In order to remove these contaminants from the lens, a cleaning liquid is applied to the lens by means of the washing device. Therein, the cleaning liquid can include water. Further, the cleaning liquid can additionally include corresponding cleaning agents and in particular cleaning agents with fat dissolving characteristics. Therein, it is in particular provided that the cleaning liquid is directly sprayed onto the lens by means of the washing device. The washing device can for example also include a corresponding nozzle, at which the cleaning liquid exits. In addition, the washing device can include a corresponding pump to provide sufficient pressure for spraying the cleaning liquid. The application of the cleaning liquid for example has the advantage over cleaning methods, in which an air flow is applied to the lens, that contaminants containing fat or oil can also be removed. Compared to cleaning methods, in which the lens is cleaned by a corresponding wiper element, the method has the advantage that the lens is not scratched.

According to an essential aspect of the invention, it is provided that the temperature of the lens is determined and the application of the cleaning liquid to the lens is performed depending on the determined temperature. The present invention is based on the realization that the lens of the camera heats up or can warm in the operation of the camera and/or in the operation of the motor vehicle. If the cleaning liquid is applied to this warmed lens, which usually has a considerably lower temperature than the lens, this can result in thermal shock, which results in the lens of the camera being damaged in the worst case. Since the lens of the camera is at least partially formed of glass, it can for example break by drastic cooling as a result of application of the cleaning liquid. In that the application of the cleaning liquid to the lens is performed depending on the temperature of the lens, damage to the lens can be prevented. Thereby, the cleaning of the lens can be securely and reliably effected.

Preferably, the cleaning liquid is applied to the lens if the temperature of the lens falls below a predetermined threshold value. Thus, it can be examined in simple manner if the current temperature of the lens falls below or exceeds the predetermined threshold value. The control of the washing device, by means of which the cleaning liquid is applied to the lens, can therefore be effected in the manner of a simple state machine. The predetermined threshold value for the temperature is dependent on the material and the configuration of the lens. For example, the threshold value can be in a range between 60° C. and 110° C., preferably in a range between 75° C. and 95° C. For example, the threshold value can be 85° C. Thus, a simple control of the washing device can be ensured and the lens can additionally be prevented from being damaged.

In a further embodiment, a temperature of the lens, a temperature of the camera and/or a temperature in the environment of the motor vehicle are measured for determining the temperature of the lens. In order to determine the temperature of the lens, the temperature of the lens can be directly measured. For this purpose, a corresponding temperature sensor, in particular a resistive temperature sensor, can for example be arranged directly on the lens of the camera. Alternatively or additionally, the temperature of the camera can be determined. Hereto, a corresponding temperature sensor can for example be used, which is present in the camera or which is arranged in a housing of the camera. Further, it can be provided that the temperature in the environment of the motor vehicle is determined. Hereto, a corresponding temperature sensor of the motor vehicle can be used. The temperature in the environment of the motor vehicle determined by this temperature sensor can for example be received from a vehicle data bus. Overall, this allows reliable determination of the temperature of the lens.

According to a further embodiment, ice and/or liquid drops present on the lens are removed as the deposit, wherein the lens is warmed by means of a heating device for removing the ice and/or the liquid drops. Deposits on the lens can also arise in that ice or snow adheres to the lens. Further, liquid drops or fog can deposit on the lens. In order to remove these deposits, a heating device can be used, by means of which the camera can be warmed or heated up. By heating up the lens, ice or snow having deposited on the lens can for example be caused to be molten. If liquid drops have deposited on the lens, they can be evaporated by heating the lens. By the employment of the washing device and the heating device, thus, different deposits on the lens can be removed.

Furthermore, it is advantageous if an operating state of the heating device is determined and the application of the cleaning liquid to the lens is additionally performed depending on the determined operating state of the heating device. As the operating state of the heating device, it can for example be determined if the heating device is activated, thus heats the lens, or if the heating device is deactivated, thus the lens is currently not warmed by the heating device. If the heating device is activated, the lens of the camera is warmed. This can be taken into account in applying the cleaning liquid to prevent damage to the lens.

Preferably, the cleaning liquid is applied to the lens if it is recognized as the operating state that the heating device is deactivated or has been activated for a predetermined turn-on time, which is less than a predetermined limit value. For example, it can be provided that the cleaning liquid is only applied to the lens if the heating device is deactivated. In this case, it can for example be assumed that the lens is currently not warmed by the heating device, and thus the cleaning liquid can be applied to the lens. Alternatively thereto, it can be examined if the heating device was activated and how long the heating device was activated. If the heating device was for example only activated for a turn-on time, which is less than a predetermined limit value, it can for example be assumed that the temperature of the lens has not been warmed beyond the predetermined threshold value by the heating device. The limit value for the turn-on time can for example be determined by corresponding experiments. It can also be provided that a temporal duration is determined, which describes, how long the heating device is already deactivated. In this case too, it can be provided that the cleaning liquid is applied to the lens if the heating device was activated for a predetermined temporal duration. In this case, it can be assumed that the lens has already sufficiently cooled down. Thus, reliable operation both of the washing device and the heating device can overall be allowed.

Furthermore, it is preferably provided that the application of the cleaning liquid to the lens remains undone if a malfunction of the heating device is recognized as the operating state. Herein, it is taken into account that a malfunction of the heating device can result in the lens for example being continuously warmed and thus reaching a relatively high temperature. If a malfunction is recognized, steps can for example be initiated in order that this malfunction is remedied. For example, a corresponding warning can be output. If in case that the malfunction is recognized, cleaning liquid is not applied to the lens, it can be ensured that the lens is not damaged as a result of a thermal shock. The malfunction of the heating device can for example be recognized based on the electrical current flowing through the heating device. If the current consumption of the heating device is for example higher than expected, a short-circuit can for example be assumed.

According to a further embodiment, a temperature of the cleaning liquid is determined and the application of the cleaning liquid to the lens is additionally performed depending on the temperature of the cleaning liquid. The cleaning liquid can for example be in a corresponding container or a reservoir. On or in this container, a corresponding temperature sensor can be provided, by which the temperature of the cleaning liquid can be determined. That cleaning liquid can also be used as the cleaning liquid, which is for example used for a windscreen washer system for cleaning the windscreen or a headlamp cleaning system for cleaning the headlamps. If the temperature of the cleaning liquid is determined, a temperature difference between the temperature of the cleaning liquid and the temperature of the lens can for example be determined and damage to the lens as a result of application of the cleaning liquid can be estimated based on the difference.

Therein, it is in particular provided that the application of the cleaning liquid to the lens remains undone if the temperature of the cleaning liquid falls below a predetermined first temperature limit value and the temperature of the lens falls below a predetermined second temperature limit value. In other words, the application of the cleaning liquid to the lens can remain undone if the temperature difference between cleaning liquid and the lens is too large. Therein, the second temperature limit value can correspond to the threshold value for the temperature of the lens. The first and the second temperature limit value can be determined in corresponding experiments. Thereby, the current temperature of the cleaning liquid is also taken into account besides the current temperature of the lens, and thus the damage to the lens can be more reliably prevented.

In a further embodiment, a deposit present on the lens is recognized by means of a contaminant recognition device and the application of the cleaning liquid is additionally performed depending on the recognized contaminant. The contaminant recognition device can for example extensively evaluate the images captured by the camera to the effect if a deposit is located on the lens of the camera. The deposit can be a contaminant or ice, snow and/or water drops. The deposits can be provided in the video data or the images provided by the camera based on the method for machine vision or be performed by a corresponding object recognition algorithm. The washing device can for example be activated if a contaminant is recognized on the lens. In the same manner, the heating device can be recognized if a deposit of ice and/or water drops is recognized on the lens. However, therein, the current temperature of the lens is to be determined and to be compared to the predetermined threshold value before activating the washing device.

A cleaning device according to the invention for a camera of a motor vehicle is adapted to perform a method according to the invention or an advantageous configuration thereof. The cleaning device can have the washing device, by means of which the cleaning liquid can be applied to the lens of the camera. Moreover, the cleaning device can have the heating device, by means of which the lens can be warmed. In addition, the cleaning device can include a temperature sensor, by which the temperature of the lens of the camera can be acquired. Furthermore, the cleaning device can have a contaminant recognition device, by means of which the deposit on the lens of the camera can be recognized. Finally, the cleaning device can include an electronic control unit, which can control the heating device and/or the washing device. The control unit can additionally receive corresponding data from the temperature sensor and/or the contaminant recognition device and control the washing device and/or the heating device depending thereon.

A camera assembly according to the invention includes a cleaning device according to the invention as well as a camera. The camera can in particular include a fixing device for fixing the camera to a corresponding receiving device of the motor vehicle. In particular, the camera can be attached to the outside of the motor vehicle.

A motor vehicle according to the invention includes at least one camera assembly. Preferably, it is provided that the motor vehicle has a plurality of camera assemblies, which are for example arranged distributed on the motor vehicle. The motor vehicle is in particular formed as a passenger car.

The preferred embodiments presented with respect to the method according to the invention and the advantages thereof correspondingly apply to the cleaning device according to the invention, to the camera assembly according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

BRIEF DESCRIPTION OF THE DRAWINGS

Now, the invention is explained in more detail based on preferred embodiments as well as with reference to the attached drawings.

There show.

DETAILED DESCRIPTION OF THE INVENTION

Figure 1:
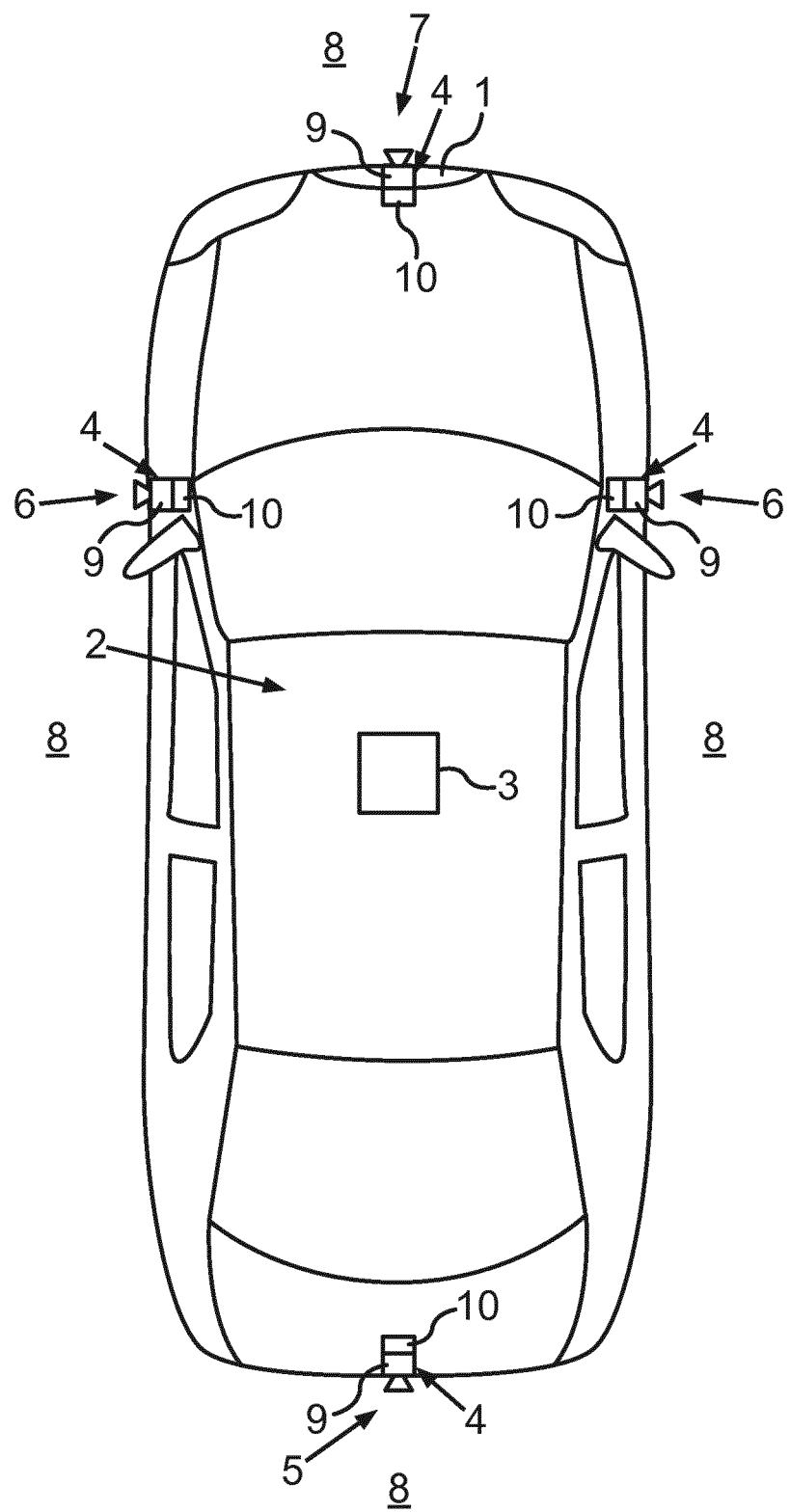
FIG. 1 in schematic representation a motor vehicle according to an embodiment of the present invention, which shows a motor vehicle with a plurality of camera assemblies.

In the figures, identical and functionally identical elements are provided with the same reference characters.

FIG. 1 shows a motor vehicle 1 according to an embodiment of the present invention in a plan view. Presently, the motor vehicle 1 is formed as a passenger car. The motor vehicle 1 includes a driver assistance system 2, which in turn can include at least one camera assembly 4. Moreover, the driver assistance system 2 includes a control device 3, which can for example be constituted by an electronic control unit of the motor vehicle 1.

In the present embodiment, the motor vehicle 1 or the driver assistance system 2 includes four camera assemblies 4, which are arranged distributed on the motor vehicle 1. Presently, a camera assembly 4 is arranged in a rear area 5 of the motor vehicle 1, a camera assembly 4 is arranged in a front area 7 of the motor vehicle 1 and two camera assemblies 4 are arranged in the respective lateral areas 6, in particular in the areas of the wing mirrors, of the motor vehicle 1. Presently, the number and arrangement of the camera assemblies 4 of the driver assistance system 2 are to be purely exemplarily understood.

The respective camera assemblies 4 each include a camera 9, which can for example be formed as a CCD camera or as a CMOS camera. An environment 8 or an environmental region of the motor vehicle 1 can be captured by the cameras 9. Hereto, an image sequence or video data can be provided by the respective cameras 9, which describe the environment 8. These image sequences can then be transmitted from the respective cameras 4 to the control device 3. Hereto, the cameras 9 are connected to the control device 3 via corresponding data lines or a vehicle data bus. Presently, the data lines are not illustrated for the sake of clarity. The individual images provided by the cameras 9 can then be processed by means of the control device 3. Moreover, the respective camera assemblies 4 include a cleaning device 10, which serves for cleaning a lens 11 of the cameras 9.

Figure 2:
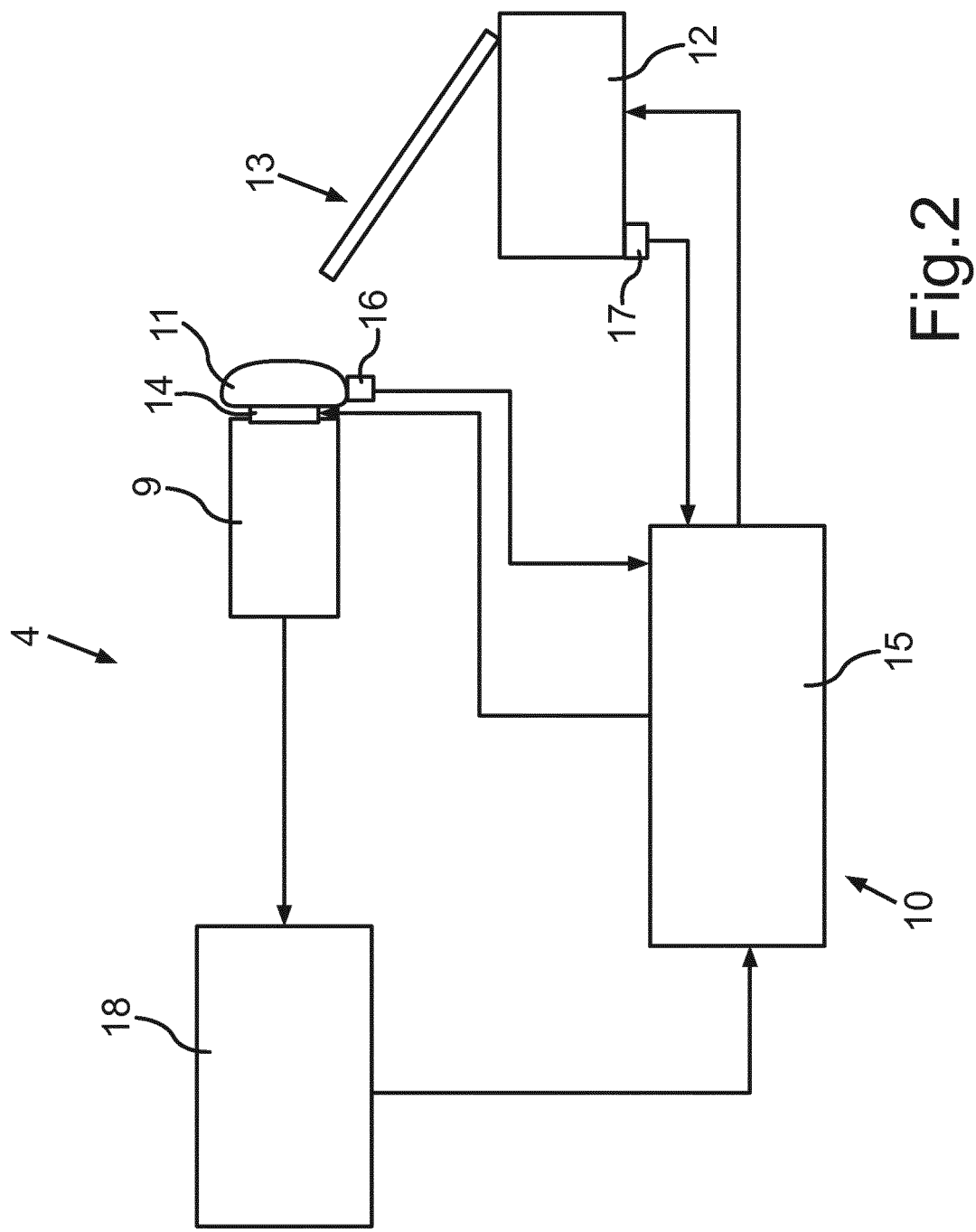
FIG. 2 camera assembly in a schematic representation.

FIG. 2 shows a schematic representation of a camera assembly 4. Herein, it is apparent that the camera assembly 4 has a camera 9 as well as a cleaning device 10 for cleaning the lens 11 of the camera 9. The cleaning device 10 includes a washing device 12, by means of which cleaning liquid 13 can be directly applied to the lens 11 of the camera 9. Presently, a jet of the cleaning liquid 13 is exemplarily illustrated, which is provided by means of the washing device 12 and is sprayed onto the lens 11 of the camera 9. By means of the washing device 12, deposits on the lens 11, which are formed by contaminants, can be removed. The contaminants can for example be dust or dirt particles. However, the contaminants can also contain oil or fat. The cleaning liquid 13 provided by the washing device 12 can for example include water and a cleaning agent.

Furthermore, the cleaning device 10 includes a heating device 14, by means of which the lens 11 of the camera 9 can be heated or warmed. The heating device 14 can for example be arranged directly on the lens 11 or be integrated in the lens 11. The heating device 14 is supplied with electrical energy by means of a control unit 15. The heating device 14 is in particular formed as an electrothermal heating device. If for example ice, snow and/or water drops are located on the lens 11 as the deposit, they can be molten or evaporated by heating the lens 11 by means of the heating device 14.

Moreover, the cleaning device 10 includes a temperature sensing unit 16, by means of which the current temperature of the lens 11 can be determined. In the present embodiment, the temperature sensing unit 16 is arranged directly on the lens 11. Alternatively thereto, the temperature sensing unit 16 can be arranged in the camera 9 or determine the temperature in the environment of the motor vehicle 1. The temperature sensing unit 16 is connected to the control unit 15 for data transfer such that the control unit 15 can receive temperature measurement values from the temperature sensing unit 16. Furthermore, the cleaning device 10 includes a temperature sensor 17, by which a temperature of the cleaning liquid 13 can be acquired. The temperature sensor 17 is also connected to the control unit 15 for data transfer such that the control unit 15 can receive corresponding temperature measurement values from the temperature sensor 17.

Finally, the cleaning device 10 includes a contaminant recognition device 18, by means of which a deposit on the lens 11 can be recognized. The contaminant recognition device 18 can for example be formed by a corresponding analyzing unit, by means of which the images provided by the camera 9 can be analyzed. For example, the deposit on the lens 11 can be recognized based on the images with the aid of machine vision. The contaminant recognition device 18 can also be provided by the control device 3. The contaminant recognition device 18 is connected to the control unit 15 for data transfer. Thus, data can be received from the contaminant recognition device 18 by the control unit 15, which describes a deposit on the lens 11. The deposit can be a contaminant, for example dust or oil, or ice and/or liquid drops.

With the aid of the control unit 15, the washing device 12 can be controlled such that it sprays cleaning liquid 13 onto the lens 11. Further, the heating device 14 can be controlled by the control device 15 such that it warms the lens 11. Therein, different control options for the washing device 12 and/or the heating device 14 can be provided, which are performed by the control unit 15. Basically, it is provided that the control unit 15 controls the washing device 12 depending on a current temperature of the lens 11. In particular, the lens 11 is to be prevented from being damaged as a result of thermal shock by applying the cleaning liquid 13. Below, different control options are explained.

According to a first control option, the cleaning liquid 13 is applied to the lens 11 by means of the washing device 12 if the heating device 14 is deactivated. Otherwise, the cleaning liquid 13 can be applied to the lens 11. For this purpose, it can be examined by the control unit 15 if it currently controls the heating device 14. If this is not the case, the cleaning liquid 13 can be applied to the lens 11.

According to a second control option, the temperature of the lens 11 is determined based on the measurement performed by the temperature sensing device 16. If the current temperature of the lens 11 exceeds a predetermined threshold value, the application of the cleaning liquid 13 to the lens 11 remains undone. If the temperature of the lens 11 falls below the predetermined threshold value, the cleaning liquid 13 can be applied to the lens. The threshold value for the temperature can be determined depending on the material or the configuration of the lens 11. It can for example be 85° C.

According to a third control option, it is first examined if a contaminant or a deposit has been recognized on the lens 11 by means of the contaminant recognition device 18. If this is the case and if the temperature of the lens 11 exceeds the predetermined threshold value, the application of the cleaning liquid 13 to the lens remains undone. If the contaminant has been recognized by means of the contaminant recognition device 18 and the temperature of the lens 11 is below the predetermined threshold value, the cleaning liquid 13 can be applied to the lens 11.

According to a fourth control option, it is examined if the heating device 14 was activated for a predetermined turn-on time. If the heating device 14 was activated for a turn-on time, which is larger than a predetermined limit value, the application of the cleaning liquid 13 to the lens 11 remains undone. Otherwise, the cleaning liquid 13 can be applied to the lens 11.

According to a fifth control option, it is examined if the temperature of the cleaning liquid 13 is less than a first temperature limit value and the temperature of the lens 11 is greater than a second temperature limit value. If this is the case, the cleaning liquid 13 is not applied to the lens 11. Otherwise, the cleaning liquid 13 can be applied to the lens 11. According to a sixth control option, the current operating state of the heating device 14 is acquired. If the current operating state describes a malfunction, the cleaning liquid 13 is not applied to the lens 11. Otherwise, the cleaning liquid 13 can be applied to the lens 11. Herein, it is taken into account that the lens 11 can be heated up with a malfunction of the heating device 14 and thus there is the risk that the lens 11 is damaged as a result of application of the cleaning liquid 13.

Overall, it can therefore be reliably prevented that the warmed lens 11 is damaged as a result of application of the cleaning liquid 13 due to the temperature differences between the cleaning liquid 13 and the lens 11.

The invention claimed is:

1. A method for removing deposits on a lens of a camera of a motor vehicle, comprising:
   removing a contaminant present on the lens as the deposit;
   applying a cleaning liquid to the lens by a washing device for removing the contaminant;
   determining a temperature of the lens and the cleaning liquid;
   wherein the application of the cleaning liquid to the lens is performed depending on the determined temperature of the lens; and
   wherein the application of the cleaning liquid to the lens is additionally performed depending on the temperature of the cleaning liquid.

2. The method according to claim 1, wherein the cleaning liquid is applied to the lens when the temperature of the lens falls below a predetermined threshold value.

3. The method according to claim 1, wherein for determining the temperature of the lens, a temperature of the lens, a temperature of the camera or a temperature in an environment of the motor vehicle are measured.

4. The method according to claim 1, wherein ice or liquid drops present on the lens are removed as the deposit, wherein the lens is warmed by means of a heating device for removing the ice or the liquid drops.

5. The method according to claim 4, wherein an operating state of a heating device is determined and the application of the cleaning liquid to the lens is additionally performed depending on the determined operating state of the heating device.

6. The method according to claim 5, wherein the cleaning liquid is applied to the lens when it is recognized as the operating state that the heating device is deactivated or was activated for a predetermined turn-on time, which is less than a predetermined limit value.

7. The method according to claim 5, wherein the application of the cleaning liquid to the lens remains undone when the heating device is recognized to be in an overheating state.

8. The method according to claim 1, wherein the application of the cleaning liquid to the lens remains undone when the temperature of the cleaning liquid falls below a predetermined first temperature limit value and the temperature of the lens exceeds a predetermined second temperature limit value.

9. The method according to claim 1, wherein a deposit present on the lens is recognized by means of a contaminant recognition device and the application of the cleaning liquid is additionally performed depending on the recognized contaminant.

10. A cleaning device for a camera of a motor vehicle, which is adapted to perform a method according to claim 1.

11. A camera assembly comprising: a cleaning device according to claim 10; and a camera.

12. A motor vehicle comprising at least one camera assembly according to claim 11.

\* \* \* \* \*